M. HENSZEY, Jr.
Pipe-Couplings for Railroad Cars.
No. 139,150. Patented May 20, 1873.
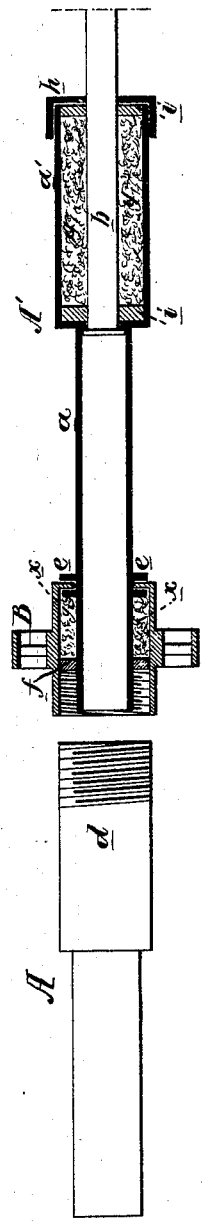
Witnesses, Hubert Howson
Harry Smith
Marshall Henszey Jr
By his attys.
Howson and Son

UNITED STATES PATENT OFFICE.

MARSHALL HENSZEY, JR., OF PHILADELPHIA, PENNSYLVANIA.

IMPROVEMENT IN PIPE-COUPLINGS FOR RAILROAD CARS.

Specification forming part of Letters Patent No. 139,150, dated May 20, 1873; application filed March 27, 1873.

*To all whom it may concern:*

Be it known that I, MARSHALL HENSZEY, Jr., of Philadelphia, Pennsylvania, have invented an Improvement in Pipe-Couplings for Railroad Cars, of which the following is a specification:

The objects of my invention are to facilitate the coupling and uncoupling of heating-pipes between railroad cars, to render the said pipes self-accommodating to the movements of the cars towards and from each other, and to prevent leakage at the joints.

I attain these objects, first, by connecting the two pipes A and A', which project from the adjoining ends of two railroad cars, by means of a nut, B, swiveled to the pipe A', and adapted to screw-threads on the pipe A; second, by making the pipe A' in two sections $a$ and $b$, one arranged to slide upon the other in the manner of a telescope; and third, by the use of packing, $x$ and $y$, within the swivel and telescopic joint, all as plainly shown in the sectional view of the accompanying drawing.

A and A' represent the ends of two pipes to be coupled together for the purpose of conducting hot air or water or steam from one railroad-car to another for heating purposes. The extreme outer end $d$ of the pipe A is enlarged in diameter, and has screw-threads cut upon it, corresponding to the internal threads of a nut, B, which is swiveled at $e$ to the pipe A', the space between the latter and the said nut being filled with packing $x$, against which the end of the pipe A is forced when screwed into the nut to complete the coupling, all leakage at the joint being thus prevented.

Any suitable packing may be employed, but I prefer to combine with the same a rubber disk, $f$, to be forced against the end of the pipe A, as shown.

In order to render the conducting-pipe self-accommodating, longitudinally, to the movements of the cars toward and from each other, I construct the portion A' of the same in two sections, $a$ and $b$, the latter being of comparatively small diameter, and arranged to slide within the former, so that it may yield to the movements of the cars and adjust itself as required.

To prevent leakage at the telescopic joint, I arrange a mass of packing, Y, within an enlargement, $a'$, of the section $a$ of the pipe, and surrounding the inner section $b$, the packing being retained in position by a screw cap, $h$, and being, if desired, composed of rubber disks $i$.

It will be observed that the pipe $b$ has a bearing at each end of the enlargement $a'$, and is therefore prevented from moving laterally and compressing the packing so as to open the joint.

I claim—

1. The within-described coupling, in which are combined two pipes A and A', a nut, B, swiveled to one of the said pipes, and a mass of packing, $x$, contained within the nut, and surrounding one pipe, and arranged to be forced against the end of the other pipe, substantially as herein set forth.

2. The combination, with the pipe $a$ and its enlargement $a'$, of the sliding pipe $b$ having a bearing at each end of said enlargement, and surrounded by a packing, as set forth.

In testimony whereof I have signed my name to this specification in the presence of two subscribing witnesses.

MARSHALL HENSZEY, JR.

Witnesses:
WM. A. STEEL,
HUBERT HOWSON.